(12) United States Patent
Kitamura et al.

(10) Patent No.: US 10,355,538 B2
(45) Date of Patent: Jul. 16, 2019

(54) BRUSHLESS MOTOR AND ELECTRICALLY POWERED TOOL

(71) Applicant: PANASONIC INTELLECTUAL PROPERTY MANAGEMENT CO., LTD., Osaka (JP)

(72) Inventors: Kota Kitamura, Mie (JP); Hidenori Shimizu, Mie (JP); Atsushi Takeyama, Mie (JP); Motoharu Muto, Mie (JP); Hiroyuki Tsubakimoto, Mie (JP); Koichi Hashimoto, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 88 days.

(21) Appl. No.: 15/521,034

(22) PCT Filed: Oct. 9, 2015

(86) PCT No.: PCT/JP2015/005128
§ 371 (c)(1),
(2) Date: Apr. 21, 2017

(87) PCT Pub. No.: WO2016/067532
PCT Pub. Date: May 6, 2016

(65) Prior Publication Data
US 2017/0358961 A1    Dec. 14, 2017

(30) Foreign Application Priority Data

Oct. 28, 2014  (JP) .................................. 2014-219112

(51) Int. Cl.
*H02K 1/14* (2006.01)
*H02K 1/18* (2006.01)
(Continued)

(52) U.S. Cl.
CPC ............. *H02K 1/146* (2013.01); *H02K 1/185* (2013.01); *H02K 5/04* (2013.01); *H02K 7/145* (2013.01); *H02K 2213/03* (2013.01)

(58) Field of Classification Search
CPC .. H02K 1/18; H02K 1/16; H02K 5/15; H02K 15/02; H02K 3/52; H02K 1/14;
(Continued)

(56) References Cited

U.S. PATENT DOCUMENTS 8,569,924 B2 * 10/2013 Yasuda .................. H02K 1/185
310/216.069
2004/0119367 A1   6/2004 Hiwaki et al.
(Continued)

FOREIGN PATENT DOCUMENTS

CN    203660682 U    6/2014
DE    527 562        6/1931
(Continued)

OTHER PUBLICATIONS

JP 2000350390 A machine translation Sep. 16, 2018.*
(Continued)

*Primary Examiner* — Quyen P Leung
*Assistant Examiner* — Leda T Pham
(74) *Attorney, Agent, or Firm* — McDermott Will & Emery LLP (57) ABSTRACT

A brushless motor includes: a stator core having a cylindrical yoke portion and a teeth portion having a shape protruding from an inner circumferential surface of the yoke portion; and a rotor that is disposed inside the stator core, spaced apart from the teeth portion, and uses a center axis of the yoke portion as an axis of rotation. The yoke portion includes, on its outer circumferential surface, a notch portion at a position on the back side of the teeth portion. The notch portion has a circumferential width smaller than a circumferential width of the teeth portion.

8 Claims, 4 Drawing Sheets

(51) Int. Cl.
*H02K 5/04* (2006.01)
*H02K 7/14* (2006.01)

(58) Field of Classification Search
CPC ............ H02K 3/32; H02K 3/46; H02K 1/146;
H02K 1/185; H02K 1/145; H02K 5/04;
H02K 2213/03
USPC .... 310/216.073, 216.074, 216.097, 216.136,
310/40 R
See application file for complete search history.

(56) References Cited

U.S. PATENT DOCUMENTS

| | | | |
|---|---|---|---|
| 2005/0116563 A1 | 6/2005 | Matsubara | |
| 2007/0273221 A1* | 11/2007 | Kinoshita | H02K 3/50 310/58 |
| 2008/0066292 A1 | 3/2008 | Matsubara | |
| 2008/0066301 A1 | 3/2008 | Matsubara | |
| 2012/0175996 A1* | 7/2012 | Ikuta | H02K 1/148 310/216.134 |
| 2013/0169106 A1* | 7/2013 | Yokogawa | H02K 1/148 310/216.111 |
| 2014/0354108 A1* | 12/2014 | Nobata | H02K 1/185 310/216.135 |
| 2015/0137654 A1 | 5/2015 | Yamagishi et al. | |
| 2015/0280535 A1* | 10/2015 | Yang | H02K 1/165 310/156.38 |
| 2016/0172910 A1* | 6/2016 | Saito | H02K 1/148 310/216.135 |

FOREIGN PATENT DOCUMENTS

| | | | |
|---|---|---|---|
| DE | 102012100158 A1 * | 7/2012 | ............ H02K 1/148 |
| EP | 1 906 510 A2 | 4/2008 | |
| GB | 2 059 177 A | 4/1981 | |
| JP | 3-66544 U | 6/1991 | |
| JP | H11-308790 A | 11/1999 | |
| JP | 2000-350390 A | 12/2000 | |
| JP | 2000350390 A * | 12/2000 | |
| JP | 2003-111317 A | 4/2003 | |
| JP | 2005-168098 A | 6/2005 | |
| JP | 2014-193083 A | 10/2014 | |
| WO | 2014/020756 A1 | 2/2014 | |

OTHER PUBLICATIONS

International Search Report and Written Opinion issued in International Patent Application No. PCT/JP2015/005128, dated Nov. 24, 2015; with partial English translation.
Extended European Search Report issued in corresponding European Patent Application No. 15855310.7, dated Jul. 13, 2017.
Chinese Office Action and search report issued in Application No. 201580057884.7 dated Sep. 28, 2018, with English translation.

* cited by examiner

BRUSHLESS MOTOR AND ELECTRICALLY POWERED TOOL

RELATED APPLICATIONS

This application is the U.S. National Phase under 35 U.S.C. § 371 of International Patent Application No. PCT/JP2015/005128, filed on Oct. 9, 2015, which in turn claims the benefit of Japanese Application No. 2014-219112, filed on Oct. 28, 2014, the disclosures of which Applications are incorporated by reference herein.

TECHNICAL FIELD

The present invention relates to a brushless motor and an electrically powered tool, and more particularly to a technique for inhibiting the rotation and core loss of a stator core.

BACKGROUND ART

For example, in portable electrically powered tools such as motorized drivers, inner-rotor-type brushless motors (brushless DC motors) capable of size reduction are often used. Such a brushless motor includes: a stator core having a cylindrical yoke portion and teeth portions protruding from an inner circumferential surface of the yoke portion; and a rotor that rotates inside the stator core. Coils are wound around the teeth portions, and a permanent magnet is provided in the rotor. The teeth portions magnetized by an electric current flowing through the coils apply a magnetic force to the permanent magnet of the rotor, and the rotor thereby rotates.

At this time, as a counteraction to the rotation of the rotor, the teeth portions also receive a magnetic force from the permanent magnet of the rotor. For this reason, in order to prevent the stator core from rotating or moving, it is necessary to fix the stator core to, for example, a housing such as tool body of an electrically powered tool or the like. For example, Patent Literature (PTL) 1 discloses a configuration in which the outer circumferential surface of the yoke portion is fixed by the inner circumferential surface of the cylindrical housing.

CITATION LIST

Patent Literature

PTL 1: Japanese Unexamined Patent Application Publication No. 2005-168098

SUMMARY OF THE INVENTION

Technical Problem

In the configuration of PTL 1, the outer circumferential surface of the yoke portion and the inner circumferential surface of the housing are both flat. Accordingly, in order to inhibit the rotation of the stator core, it is necessary to apply a strong compressive force from the inner circumferential surface of the housing toward the outer circumferential surface of the yoke portion by, for example, press fitting, shrink fitting, or the like. In this case, however, a stress is generated inside the yoke portion due to the compressive force, which deteriorates the magnetic characteristics of the yoke portion and increases the core loss generated in the stator core.

Accordingly, it is an object of the present invention to provide a brushless motor that can inhibit the rotation of the stator core, and at the same time prevent an increase in the core loss generated in the stator core, and an electrically powered tool including the brushless motor.

Solution to Problem

A brushless motor according to one aspect of the present invention includes: a stator core including a cylindrical yoke portion and a teeth portion having a shape protruding from an inner circumferential surface of the yoke portion; and a rotor that is disposed inside the stator core, spaced apart from the teeth portion, and uses a center axis of the yoke portion as an axis of rotation, wherein the yoke portion includes, on an outer circumferential surface of the yoke portion, a notch portion at a position on a back side of the teeth portion, and the notch portion has a circumferential width smaller than a circumferential width of the teeth portion.

Advantageous Effects of Invention

In the brushless motor according to the above-described aspect, because the notch portion is provided on the outer circumferential surface of the stator core, the rotation of the stator core can be inhibited without application of a strong compressive force toward the outer circumferential surface of the yoke portion. Accordingly, in the brushless motor, it is possible to inhibit the rotation of the stator core, and at the same time prevent an increase in the core loss generated in the stator core. Also, in the brushless motor, the notch portion has a shape that does not limit a path for magnetic flux that passes through the yoke portion in the circumferential direction, and from this point as well, it is possible to prevent an increase in the core loss generated in the stator core.

DESCRIPTION OF EXEMPLARY EMBODIMENTS

Hereinafter, embodiments of the present invention will be described. Note that the embodiments described below show preferred specific examples of the present invention. Accordingly, the numerical values, shapes, materials, structural elements, the arrangement and connection of the structural elements, and the like shown in the following embodiments are merely examples, and therefore are not intended to limit the scope of the present invention. Accordingly, among the structural elements described in the following embodiments, structural elements not recited in any one of the independent claims are described as arbitrary structural elements.

In addition, the diagrams are schematic representations, and thus are not necessarily true to scale. Also, in the diagrams, structural elements that are substantially the same are given the same reference numerals, and a redundant description will be omitted or simplified.

Embodiment 1

Hereinafter, brushless motor 10 according to Embodiment 1 will be described with reference to the drawings. The diagrams include schematic representations, and thus the scale and aspect ratio of structural members may be different from the actual scale and aspect ratio. Also, in the present application, the term "vertical cross section" refers to a cross section taken along a plane including an axis of rotation of a brushless motor, and the term "horizontal cross section" refers to a cross section taken along a plane perpendicular to the axis of rotation.

[1. Configuration of Brushless Motor 10]

Figure 1:
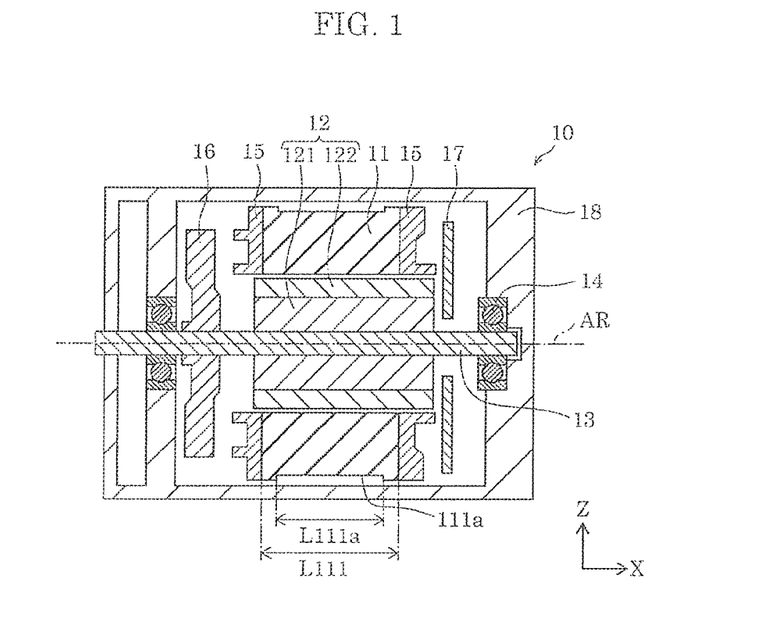
FIG. 1 is a schematic vertical cross-sectional view of a brushless motor according to Embodiment 1.
Figure 2:
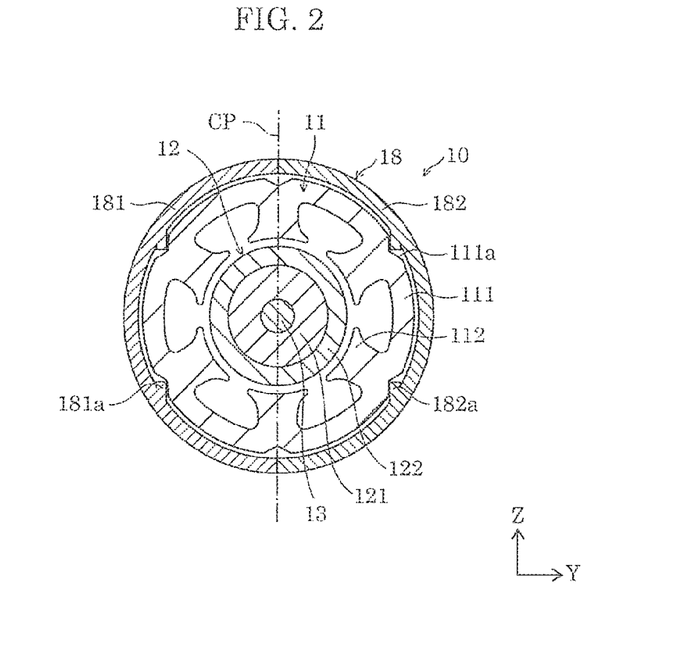
FIG. 2 is a schematic horizontal cross-sectional view of the brushless motor according to Embodiment 1.

A configuration of brushless motor 10 will be described first with reference to FIGS. 1 and 2. FIG. 1 is a vertical cross-sectional view of brushless motor 10 according to Embodiment 1. FIG. 2 is a horizontal cross-sectional view of brushless motor 10 according to Embodiment 1. In this specification, as shown in the diagrams, X axis refers to a direction extending along axis of rotation AR of brushless motor 10, Z axis refers to a direction perpendicular to X axis on the paper plane of FIG. 1, and Y axis refers to a direction perpendicular to Z axis on the paper plane of FIG. 2. Also, the positive direction of X axis refers to a direction from the left side to the right side of FIG. 1 and a direction from the far side to the near side on the paper plane of FIG. 2, the positive direction of Y axis refers to a direction from the near side to the far side on the paper plane of FIG. 1 and a direction from the left side to the right side of FIG. 2, and the positive direction of Z axis refers to a direction from the bottom to the top of FIGS. 1 and 2. Accordingly, FIG. 2 corresponds to a horizontal cross-sectional view of brushless motor 10 as viewed from the right side of the paper plane of FIG. 1.

Brushless motor 10 is an inner-rotor-type brushless DC motor, and is used as, for example, a drive source for driving an electrically powered tool such as a drill driver or an impact driver. As shown in FIG. 1, brushless motor 10 includes stator core 11, rotor 12, shaft 13, bearings 14, insulator 15, fan 16, circuit substrate 17, and housing 18.

As can be seen from FIG. 2 showing a horizontal cross-sectional view of stator core 11 and rotor 12, stator core 11 includes cylindrical yoke portion 111 and teeth portions 112 having a shape protruding from an inner circumferential surface of yoke portion 111 toward rotor 12. Stator core 11 is formed by, for example, stacking and bonding thin steel plates such as electromagnetic steel sheets.

Yoke portion 111 includes, on its outer circumferential surface, notch portions 111a at positions on the back side of teeth portions 112. As shown in FIG. 2, or in other words, in a cross section perpendicular to axis of rotation AR, each notch portion 111a is, for example, a V-shaped notch, and is continuous in X axis direction as shown in FIG. 1. As will be described later, stator core 11 including yoke portion 111 is fixed to housing 18 by notch portions 111a.

Coils (not shown) such as enameled wires are wound around teeth portions 112, and teeth portions 112 can be magnetized by causing an electric current to flow though the coils. Also, magnetic poles directed toward rotor 12 by teeth portions 112 can be changed depending on the direction of the current flowing through the coils. FIG. 2 shows a 6-slot configuration in which six teeth portions 112 are provided, but the configuration of teeth portions 112 is not limited thereto. For example, the number of teeth portions 112 may be less than 6, or may be greater than 6.

Hereinafter, the terms "radial direction" and "circumferential direction" are directions based on a cross section (horizontal cross section) of yoke portion 111 that is perpendicular to axis of rotation AR. That is, the radial direction refers to a direction extending from a center point of a circle corresponding to the outer circumferential surface of yoke portion 111 toward the outer circumferential surface of yoke portion 111 in the horizontal cross section, and the circumferential direction refers to a direction extending along the outer circumferential surface of yoke portion 111 in the horizontal cross section. Also, the center axis of yoke portion 111 refers to an axis that is parallel to X axis direction and passes through the center point of the circle corresponding to the outer circumferential surface of yoke portion 111 in the horizontal cross section.

Rotor 12 is a member that rotates about axis of rotation AR that is the center axis of yoke portion 111, and is disposed inside stator core 11, spaced apart from teeth portions 112. Rotor 12 includes cylindrical rotor core 121 and permanent magnet 122 provided around rotor core 121. In permanent magnet 122, north and south poles are alternately provided in the circumferential direction. There is no particular limitation on the number of poles of permanent magnet 122, and the number of poles of permanent magnet 122 may be, for example, two, four, eight or the like. As described above, teeth portions 112 can change the magnetic poles and cause rotor 12 to rotate by changing the magnetic forces applied to permanent magnet 122 by teeth portions 112.

Shaft 13 is a columnar member that passes through rotor core 121 and rotates unitarily with rotor 12. A center axis of shaft 13 is substantially coincident with axis of rotation AR. Also, shaft 13 has a length extending from two ends of rotor core 121 in X axis direction and also extending from one end of housing 18 in X axis direction. In brushless motor 10, the rotational force of rotor 12 can be output to the outside through the extended portion of shaft 13 extending from housing 18.

Bearings 14 are members that are fixed to housing 18 and hold shaft 13 so as to be capable relative rotation with respect to housing 18, and are disposed in a pair of positions with rotor 12 interposed therebetween in X axis direction.

Insulator 15 is a member that electrically insulates stator core 11 from the coils, and is disposed so as to cover a surface of teeth portions 112 excluding their tip ends as well as two ends of yoke portion 111 in X axis direction. That is, the coils are wound directly around insulator 15 covering teeth portions 112. In FIG. 2, illustration of insulator 15 is omitted.

Fan 16 is a disc-shaped member that rotates unitarily with shaft 13 at a position between rotor 12 and one of bearings 14. Fan 16 functions as a centrifugal air blower, and causes air to flow in X axis direction so as to prevent an increase in the internal temperature of housing 18. Although not shown, through holes, slits or the like are formed in housing 18 so that air can move in and out of housing 18 while the fan is moving air.

Circuit substrate 17 is a member disposed between rotor 12 and bearing 14 on a side opposite to the side where fan 16 is provided, and is fixed to housing 18. On circuit substrate 17, magnetic sensor circuits that detect positions of the magnetic poles, control circuits that control the electric current passing through the coils and the like are formed by using electronic components. The magnetic sensor circuits are implemented by, for example, hall elements or the like, and detect positions of the magnetic poles in the circumferential direction of permanent magnet 122 provided in rotor 12. Furthermore, the control circuits change the electric current passing through the coils according to the positions of the magnetic poles detected by the hall elements so as to enable rotor 12 to smoothly rotate in a desired direction at a desired speed. Also, wiring connecting the circuits and an external power source, electrodes (not shown), and the like are drawn out from circuit substrate 17 to the outside of housing 18.

Although not illustrated in FIG. 1, there is no particular limitation on the method for fixing circuit substrate 17 to housing 18, and it is possible to use, for example, fitting, screwing, bonding, or the like. Alternatively, circuit substrate 17 may be fixed to housing 18 by providing a heatsink fixed to housing 18 between bearing 14 and circuit substrate 17 and fixing circuit substrate 17 to the heatsink.

Housing 18 is a cylindrical member made of, for example, a metal, a resin or the like, and houses structural members including stator core 11 and rotor 12. In the present embodiment, housing 18 has cut plane CP extending along a plane including the center axis (axis of rotation AR) of housing 18 and Z axis, and housing 18 are composed of two housing pieces 181 and 182 that are bonded to each other in cut plane CP. Also, housing pieces 181 and 182 respectively include fixing portions 181a and 182a having a rib shape protruding in Z axis direction from the inner circumferential surface of housing pieces 181 and 182. In the present embodiment, housing piece 181 includes two fixing portions 181a, and housing piece 182 includes two fixing portions 182a. Although not illustrated in the diagram, fixing portions 181a and 182a have a continuous shape in X axis direction. Also, fixing portions 181a and 182a may be unitary members with housing pieces 181 and 182 respectively, or may be separate members bonded to housing pieces 181 and 182 respectively.

[2. Advantageous Effects of Notch Portion 111a]

[2-1. Inhibition of Rotation of Stator Core]

In brushless motor 10, as shown in FIG. 2, notch portions 111a of stator core 11 are in contact with fixing portions 181a and 182a of housing 18. To be more specific, four notch portions 111a of six notch portions 111a, excluding two notch portions 111a located at peak positions in Z axis direction, are in contact with fixing portions 181a and 182a. Also, in a cross section perpendicular to axis of rotation AR, each of four notch portions 111a is in contact with one of fixing portions 181a and 182a, with one side of the V shape of the notch portion being in contact the fixing portion. Two fixing portions 181a of housing piece 181 are in contact with notch portions 111a such that fixing portions 181a are in contact with different sides of the V shape of notch portions 111a in the circumferential direction. The same applies to two fixing portion 182a of housing piece 182.

At this time, for example, in FIG. 2, the clockwise rotation of stator core 11 is inhibited by lower fixing portion 181a in Z axis direction and upper fixing portion 182a in Z axis direction, and the counterclockwise rotation is inhibited by upper fixing portion 181a in Z axis direction and lower fixing portion 182a in Z axis direction. That is, in stator core 11, the circumferential rotation of stator core 11 with respect to housing 18 can be inhibited by causing notch portions 111a and housing 18 (fixing portions 181a and 182a) to be in contact with each other.

As a method for inhibiting the rotation of stator core 11, for example, a method is conceivable in which protrusion portions are provided on the outer circumferential surface of yoke portion 111 and recess portions are provided on the inner circumferential surface of housing 18. In this case, however, it is necessary to bulge the outer circumferential surface of housing 18 in order to compensate for a reduction in the strength and shielding property due to the recess portions formed on the inner circumferential surface of housing 18. Accordingly, in this case, the size reduction of brushless motor 10 is hindered, and an advantage of inner-rotor-type brushless motors such as the capability of size reduction is lost.

On the other hand, in brushless motor 10 according to Embodiment 1, the rotation of stator core 11 is inhibited by notch portions 111a formed on the outer circumferential surface of yoke portion 111. Accordingly, it is unnecessary to bulge the outer circumferential surface of housing 18, and thus the size reduction of brushless motor 10 is not hindered.

[2-2. Prevention of Increase in Core Loss Generated in Stator Core]

In brushless motor 10, as described above, an effect of inhibiting the rotation of stator core 11 can be obtained by notch portions 111a and fixing portions 181a and 182a coming into contact with each other. Accordingly, it is unnecessary to apply a strong compressive force from the inner circumferential surface of housing 18 toward the outer circumferential surface of yoke portion 111 as in the conventional technique, and it is therefore possible to prevent the deterioration of magnetic characteristics caused by a stress generated inside yoke portion 111 and eventually prevent an increase in core loss generated in stator core 11.

As a method for reducing the stress generated inside yoke portion 111, for example, a method is conceivable in which simply, notches, holes, or the like are formed on the outer circumferential surface of yoke portion 111, and fixing portions 181a and 182a of housing 18 are brought into contact with the formed notches, holes, or the like. In this case, however, the magnetic efficiency of yoke portion 111 may deteriorate due to the notches, holes, or the like, and the core loss generated in stator core 11 may increase.

To be specific, first, as a result of an electric current flowing through the coils, a magnetic flux that passes through stator core 11 is generated in stator core 11. The magnetic flux flows from teeth portion 112 that directs the south pole toward rotor 12 to teeth portion 112 that directs the north pole toward rotor 12 through yoke portion 111. If, as described above, there is a notch, a hole, or the like at a position that limits the magnetic flux path, the magnetic characteristics of yoke portion 111 deteriorate, which increases the core loss generated in stator core 11.

Figure 3:
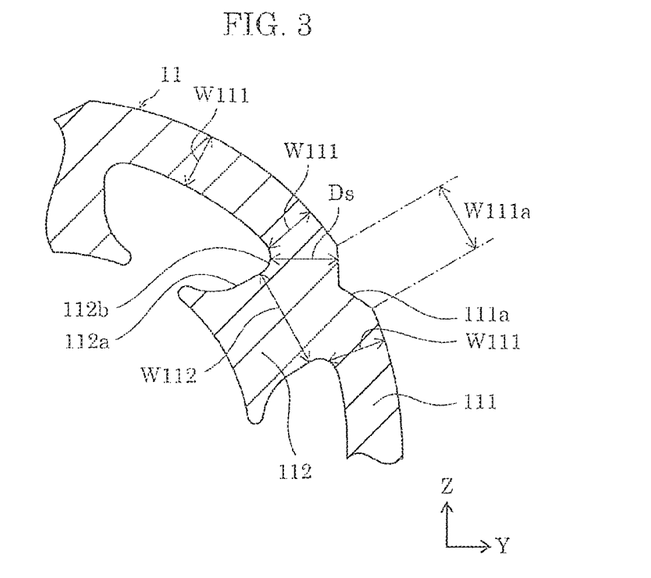
FIG. 3 is a partially enlarged view of FIG. 2.

On the other hand, in brushless motor 10 according to Embodiment 1, as will be described below, notch portions 111a do not limit the magnetic flux path. FIG. 3 is a partially enlarged view of FIG. 2, particularly, an enlarged view showing the vicinity of notch portion 111a.

As shown in FIG. 3, in brushless motor 10, circumferential width W111a of notch portion 111a is smaller than circumferential width W112 of teeth portion 112. In FIG. 2, width W112 of teeth portion 112 is wider at the tip end portion and is not constant. In this case, it is sufficient that width W111a is smaller than the shortest of width W112.

At this time, circumferential width W111a of notch portion 111a is smaller than the circumferential width of a part of the outer circumferential surface of yoke portion 111 that is on the back side of teeth portion 112, and notch portion 111a is in the back side part. Accordingly, as shown in FIG. 3, where the radial width of a part of yoke portion 111 that does not include notch portion 111a is represented by yoke width W111, the radial width of yoke portion 111 is maintained at yoke width W111 to the vicinity of bonding portion 112b where teeth portion 112 and yoke portion 111 are bonded.

In other words, in brushless motor 10, yoke width W111 is maintained up to an area (vicinity of bonding portion 112b) where the magnetic flux flowing through yoke portion 111 in the circumferential direction bends into teeth portion 112, and thus in this range, notch portion 111a does not limit the magnetic flux path.

Also, in the case where brushless motor 10 has, for example, a 2-pole 6-slot configuration, not all teeth portions 112 are simultaneously magnetized, and thus depending on the timing, non-magnetized teeth portion 112 that is not magnetized is present. In the vicinity of non-magnetized teeth portion 112, the magnetic flux passing through yoke portion 111 in the circumferential direction flows through yoke portion 111 in the circumferential direction without flowing into non-magnetized teeth portion 112. In brushless motor 10, even in such a case, the magnetic flux flowing through yoke portion 111 in the circumferential direction can be diverted toward non-magnetized teeth portion 112 before the magnetic flux reaches notch portion 111a, without reducing the cross-sectional area through which the magnetic flux passes. In other words, even in the vicinity of non-magnetized teeth portion 112, notch portion 111a does not limit the magnetic flux path.

As described above, in brushless motor 10, notch portions 111a have a shape that does not limit the path for magnetic flux flowing through yoke portion 111 in the circumferential direction, and it is possible to prevent an increase in the core loss generated in stator core 11.

[2-3. Summation]

As described above, brushless motor 10 includes stator core 11 having cylindrical yoke portion 111 and teeth portions 112 having a shape protruding from the inner circumferential surface of yoke portion 111. Also, brushless motor 10 includes rotor 12 that is disposed inside stator core 11, spaced apart from teeth portions 112, and uses the center axis of yoke portion 111 as axis of rotation AR. Furthermore, in brushless motor 10, yoke portion 111 includes, on its outer circumferential surface, notch portions 111a at positions on the back side of teeth portions 112, and circumferential width W111a of notch portions 111a is smaller than circumferential width W112 of teeth portions 112.

In brushless motor 10 configured as described above, as a result of notch portions 111a being provided on the outer circumferential surface of stator core 11, it is possible to inhibit the rotation of stator core 11 without application of a strong compressive force toward the outer circumferential surface of yoke portion. Accordingly, in brushless motor 10, it is possible to inhibit the rotation of stator core 11, and at the same time prevent an increase in the core loss generated in stator core 11. Also, in brushless motor 10, notch portions 111a have a shape that does not limit the path for magnetic flux passing through yoke portion 111 in the circumferential direction, and from this point as well, it is possible to prevent an increase in the core loss generated in stator core 11.

[3. Remarks]

[3-1. Minimum Distance from Notch Portion to Teeth Portion]

As shown in FIG. 3, in brushless motor 10, it is preferable that minimum distance Ds from notch portion 111a to surface 112a of teeth portion 112 is greater than yoke width W111. To be specific, as shown in FIG. 3, in brushless motor 10, in a cross section perpendicular to axis of rotation AR, minimum distance Ds refers to a distance from an outer surface of yoke portion 111 where notch portion 111a is formed to surface 112a of teeth portion 112 where bonding portion 112b is formed. In other words, minimum distance Ds corresponds to the shortest thickness between notch portion 111a of stator core 11 and bonding portion 112b.

In this case, the thickness of stator core 11 through which the magnetic flux passes between yoke portion 111 and teeth portion 112 can be set to a thickness greater than or equal to yoke width W111, and thus the flow of magnetic flux is not limited in this range. In other words, notch portion 111a has a shape that does not limit the magnetic flux path between yoke portion 111 and teeth portion 112, and it is therefore possible to prevent an increase in the core loss generated in stator core 11.

[3-2. Shape of Bonding Portion Between Teeth Portion and Yoke Portion]

Figure 4:
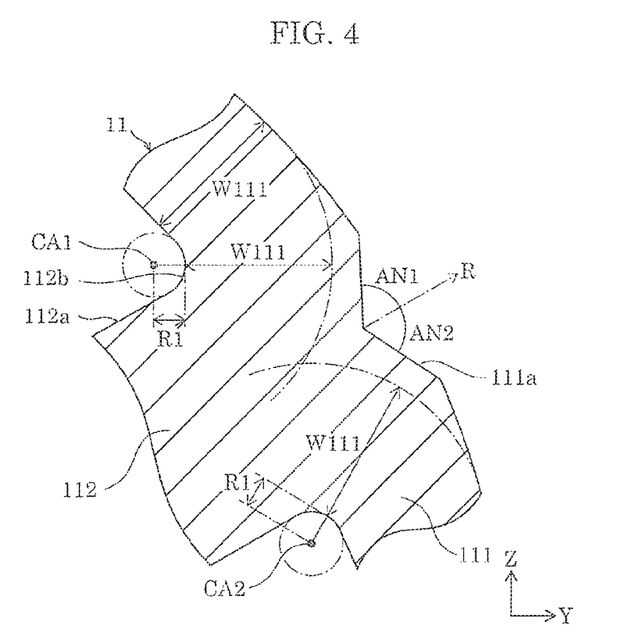
FIG. 4 is a partially enlarged view of FIG. 3.

FIG. 4 is a partially enlarged view of FIG. 3. As shown in FIG. 4, in brushless motor 10, in a cross section perpendicular to axis of rotation AR, it is preferable that surface 112a of teeth portion 112 is shaped in an arc that is concavely curved inwardly of teeth portion 112 at bonding portion 112b where teeth portion 112 and yoke portion 111 are bonded. In this case, the magnetic flux flowing between yoke portion 111 and teeth portion 112 can flow along the arc, and is not limited by bonding portion 112b.

Also, in this case, it is preferable that notch portion 111a is present outside the range from each of arc centers CA1 and CA2 to the total length of arc radius R1 and yoke width W111, or in other words, outside dash-dotted arcs shown in FIG. 4. With this configuration, the thickness of stator core 11 through which the magnetic flux passes when the magnetic flux flows along the arc between yoke portion 111 and teeth portion 112 can be set to a thickness greater than or equal to yoke width W111, and thus the flow of magnetic flux is not limited in this range.

Accordingly, in brushless motor 10 configured as described above, it is possible to prevent an increase in the core loss generated in stator core 11.

[3-3. Shape of Notch Portion]

In brushless motor 10, as shown in FIG. 2, in a cross section perpendicular to axis of rotation AR, it is preferable that notch portions 111a have a V shape. V-shaped notch portions 111a can be formed easily by press working when stator core 11 is formed, and have a shape that is readily formed on the outer circumferential surface of yoke portion 111. Accordingly, it is possible to prevent a reduction in the strength of stator core 11. Furthermore, at this time, as shown in FIG. 4, it is preferable that angles AN1 and AN2 that are formed between radial direction R and each of two sides of the V shape is 25° or more and 65° or less.

In order to obtain the effect of inhibiting the rotation of stator core 11 (in order to attain the strength of fixing portions 181a and 182a), circumferential width W111a of notch portion 111a needs to be greater than or equal to a certain width. Here, as a result of angles AN1 and AN2 being set to 25° or more, it is possible to attain circumferential width W111a of notch portion 111a without forming notch portion 111a to extend to a position deep into yoke portion 111. Accordingly, in this case, it is possible to prevent a reduction in the strength of yoke portion 111.

Also, as a result of angles AN1 and AN2 being set to 65° or less, the frictional force between notch portion 111a and fixing portion 181a or 182a is improved, and thus the effect of inhibiting the rotation of stator core 11 can be improved.

In particular, it is further preferable that angles AN1 and AN2 are 30° or more and 60° or less. In this case, it is possible to sufficiently obtain the effect of preventing a reduction in the strength of yoke portion 111 and the effect of inhibiting the rotation of stator core 11.

Furthermore, in this case, if the sum of angle AN1 and angle AN2 is 90°, by forming fixing portions 181a and 182a to have a rectangular parallelepiped shape, it is possible to bring each of fixing portions 181a and 182a into contact with two sides of notch portion 111a. In other words, it is possible to easily form fixing portions 181a and 182a and improve the effect of inhibiting the rotation of stator core 11.

Also, in brushless motor 10, for example, as shown in FIG. 1, it is preferable that length L111a of notch portion 111a in a direction (X axis direction) extending along axis of rotation AR is shorter than length L111 of yoke portion 111 in X axis direction. In this case, a height difference or a slope that extends in X axis direction is formed on the outer circumferential surface of yoke portion 111, and thus by bringing fixing portions 181a and 182a to the height difference or the slope, the movement of stator core 11 in X axis direction is restricted. In other words, the relative position of stator core 11 in X axis direction inside housing 18 can be fixed, and it is possible to improve the assembly efficiency of brushless motor 10 and prevent the occurrence of malfunction during rotation of the stator core.

[3-4. Configuration of Housing]

In brushless motor 10, as shown in FIG. 2, it is preferable that notch portions 111a that are in contact with housing pieces 181 and 182 are open in a direction (Y axis direction) perpendicular to cut plane CP. As used herein, the expression "notch portion 111a is open in a certain direction" refers to a state in which the bottom portion of notch portion 111a is viewable when the outer surface of stator core 11 is viewed from the certain direction. For example, when two notch portions 111a located at the peak positions in Z axis direction shown in FIG. 2 are viewed from the outer surface of stator core 11 in Y axis direction, their bottom portion cannot be seen. Accordingly, above two notch portions 111a are not open in Y axis direction. On the other hand, when remaining four notch portions 111a are viewed from the outer surface of stator core 11 in Y axis direction, their bottom portion can be seen. Accordingly, remaining four notch portions 111a are open in Y axis direction.

When notch portions 111a are open in Y axis direction, during assembly of brushless motor 10, fixing portions 181a and 182a can be brought into contact with the bottom portions of notch portions 111a by bringing housing pieces 181 and 182 toward stator core 11 in Y axis direction and bonding housing pieces 181 and 182. Accordingly, with an easy assembling method, housing 18 can be brought into contact with innermost portions (bottom portions) of notch portions 111a, and it is possible to obtain the effect of further inhibiting the rotation of stator core 11.

[3-5. Others]

In brushless motor 10, as shown in FIG. 2, it is preferable that the outer circumferential surface of yoke portion 111 is not in contact with the inner circumferential surface of housing 18 excluding four notch portions 111a that are in contact with fixing portions 181a and 182a. With this configuration, a compressive force from the inner circumferential surface of housing 18 toward the outer circumferential surface of yoke portion 111 is not applied, and it is therefore possible to prevent the occurrence of a stress inside yoke portion 111 and prevent an increase in the core loss generated in stator core 11.

[4. Variation of Embodiment 1]

Brushless motor 10 according to Embodiment 1 has been described above, but the present invention is not limited to the foregoing description except for an essential characteristic structural element thereof. Hereinafter, a variation of brushless motor 10 will be described as another aspect of the present invention. Structural elements that are the same as those described above will be given the same reference numerals, and a description thereof will be simplified or omitted.

[4-1. Fixing Portion]

Figure 5:
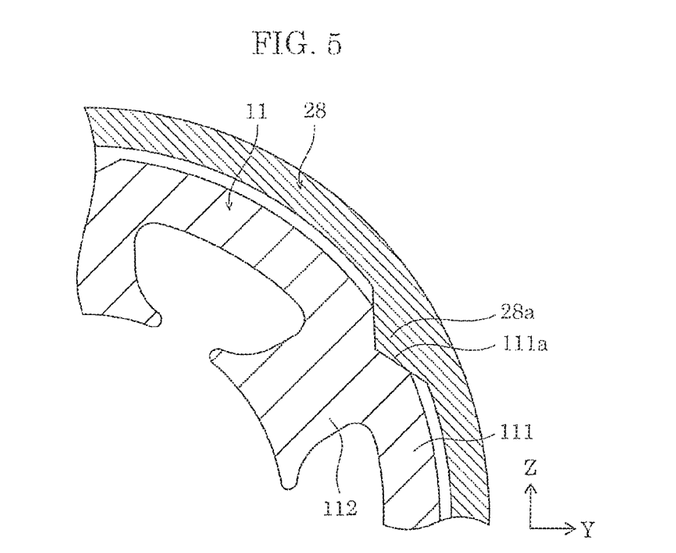
FIG. 5 is a schematic horizontal cross-sectional view illustrating a housing according to a variation.

In the above embodiment, fixing portions 181a and 182a of housing 18 have a rib shape protruding in Z axis direction from the inner circumferential surface of housing pieces 181 and 182, but the shape of fixing portions 181a and 182a is not limited thereto. FIG. 5 shows a schematic horizontal cross section used to illustrate housing 28 according to a variation. FIG. 5 shows the same cross section as that of FIG. 3 except that housing 28 is added.

As shown in FIG. 5, housing 28 is different from housing 18 in that housing 28 includes fixing portion 28a having a shape different from that of fixing portions 181a and 182a. Fixing portion 28a has a V-shaped cross section that corresponds to the cross-sectional shape of notch portion 111a and is simultaneously in contact with two sides of the V shape of notch portion 111a. Fixing portion 28a may be fully in contact with notch portion 111a in X axis direction, or may be partially in contact with notch portion 111a in X axis direction.

With the use of housing 28 as well, notch portion 111a of stator core 11 and fixing portion 28a can be brought into contact with each other. Accordingly, it is possible to inhibit the circumferential rotation of stator core 11, and at the same time prevent an increase in the core loss generated in stator core 11.

With housing 28, it is possible to inhibit the circumferential rotation of stator core 11 in both clockwise and counterclockwise directions by using one fixing portion 28a. Accordingly, it is unnecessary to provide a plurality of fixing portions 28a, and it is sufficient to provide only one fixing portion 28a in housing 28. However, by providing a plurality of fixing portions 28a in housing 28, the load applied to fixing portions 28a to inhibit the rotation of stator core 11 can be distributed, and thus the strength of housing 28 can be improved.

[4-2. Notch Portion]

Figure 6:
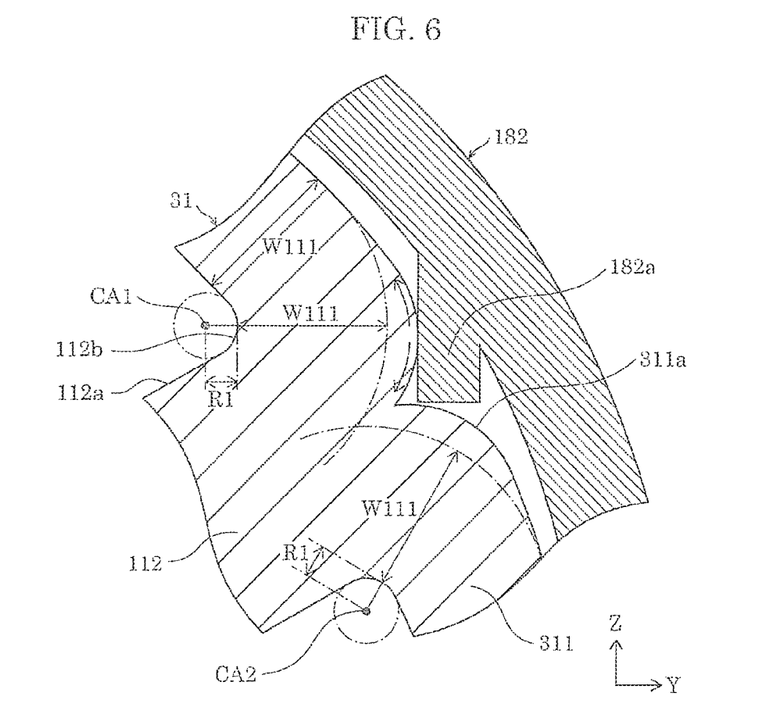
FIG. 6 is a schematic horizontal cross-sectional view illustrating a stator core according to a variation.

As shown in FIG. 2, in stator core 11, as the cross-sectional shape of notch portions 111a that is perpendicular to axis of rotation AR, a V shape having two straight sides is used as an example, but the shape of the notch portions is not limited thereto. FIG. 6 is a schematic horizontal cross-sectional view used to illustrate stator core 31 according to a variation. FIG. 6 shows a cross section of the same area as that shown in FIG. 4 in which stator core 31 and housing piece 182 are additionally shown.

As shown in FIG. 6, stator core 31 is different from stator core 11 in that yoke portion 311 includes notch portion 311a having a shape different from that of notch portion 111a. In FIG. 6, or in other words, in a cross section perpendicular to axis of rotation AR, notch portion 311a has a V shape with each of two sides of the V shape being convexly curved outwardly of yoke portion 311. Note that, however, notch portion 311a has the same configuration as that of notch portion 111a except that each of two sides of the V shape is convexly curved. In particular, notch portion 311a is located at a position on the outer circumferential surface of yoke portion 111 that is on the back side of teeth portion 112, and has a circumferential width smaller than circumferential width W112 of teeth portion 112. Accordingly, in stator core 31 as well, as a result of notch portions 311a being brought into contact with fixing portions 181a and 182a of housing 18, it is possible to inhibit the circumferential rotation of stator core 31, and at the same time prevent an increase in the core loss generated in stator core 31.

Also, in stator core 31, because notch portion 311a is formed in the above-described shape, notch portion 311a has an arcuate surface. Accordingly, even if notch portion 311a in contact with fixing portion 181a or 182a receives a reaction force that inhibits rotation from fixing portion 181a or 182a, the reaction force is distributed, for example, in the surface direction of notch portion 311a as indicated by arrows in FIG. 6. As a result, a compressive stress in the thickness direction generated inside stator core 31 is reduced, and an increase in the core loss generated in stator core 31 can be prevented.

As with stator core 11, in stator core 31 as well, in a cross section perpendicular to axis of rotation AR, it is preferable that surface 112a of teeth portion 112 is shaped in an arc at bonding portion 112b where teeth portion 112 and yoke portion 111 are bonded, the arc being concavely curved inwardly of teeth portion 112. Also, in this case, it is preferable that notch portion 311a is not present within the range from each of arc centers CA1 and CA2 to the total length of arc radius R1 and yoke width W111, or in other words, within dash-dotted arcs shown in FIG. 6.

[4-3. Others]

In brushless motor 10, yoke portion 111 is configured such that notch portions 111a are provided at positions on the outer circumferential surface that are on the back side of all teeth portions 112, but the configuration is not limited thereto. Notch portion 111a may be provided on the back side of at least one teeth portion 112. In other words, yoke portion 111 may be configured such that, on the outer circumferential surface, no notch portions 111a are provided on the back side of teeth portions 112.

In brushless motor 10, as the cross-sectional shape of notch portions 111a that is perpendicular to axis of rotation AR, a V shape is used as an example. However, the cross-sectional shape is not limited thereto, and may be any shape as long as fixing portions 181a and 182a can come into contact. For example, the cross-sectional shape of the notch portions may be a U shape, a semi-circular shape, a semi-elliptical shape, or a shape obtained by combining segments of a polygon including a straight line and a curved line. With any of the shapes, it is preferable that the notch portions are open in a direction perpendicular to the cut plane of the housing pieces.

Also, in brushless motor 10, notch portion 111a is configured to be continuous in X axis direction, but the configuration is not limited thereto. For example, notch portion 111a may be formed only in a short portion in X axis direction, or may be composed of a plurality of intermittently arranged portions in X axis direction. In this case, the fixing portion of the housing can be formed to have a shape that fits thereinto as appropriate.

Also, in brushless motor 10, teeth portions 112 have a shape in which width W112 is wider at the protruding tip end portion, but the shape is not limited thereto. The width may be constant. Alternatively, teeth portions 112 may have a shape in which the width continuously increases toward the tip end, a shape in which the width continuously decreases toward the tip end, or the like.

Also, in brushless motor 10, rotor 12 is a surface permanent magnet (SPM), but the rotor is not limited thereto, and rotor 12 may be an interior permanent magnet (IPM).

Also, in brushless motor 10, inside housing 18, fan 16 is disposed on the side where shaft 13 extends from one end of housing 18, and circuit substrate 17 is disposed on the opposite side, but the configuration is not limited thereto. The positions of fan 16 and circuit substrate 17 may be reversed. Also, fan 16 and circuit substrate 17 may be disposed on the same side as viewed from stator core 11 and rotor 12. Also, either one or both of fan 16 and circuit substrate 17 may be disposed outside housing 18. Furthermore, fan 16 and circuit substrate 17 may be omitted if external members of the motor that can function as fan 16 and circuit substrate 17 are available.

Also, in brushless motor 10, the center axis of yoke portion 111 is used as axis of rotation AR of rotor 12, but this relationship is not necessarily precisely coincident, and it is sufficient that they are coincident within a range that takes into consideration production errors and the like.

Embodiment 2

Figure 7:
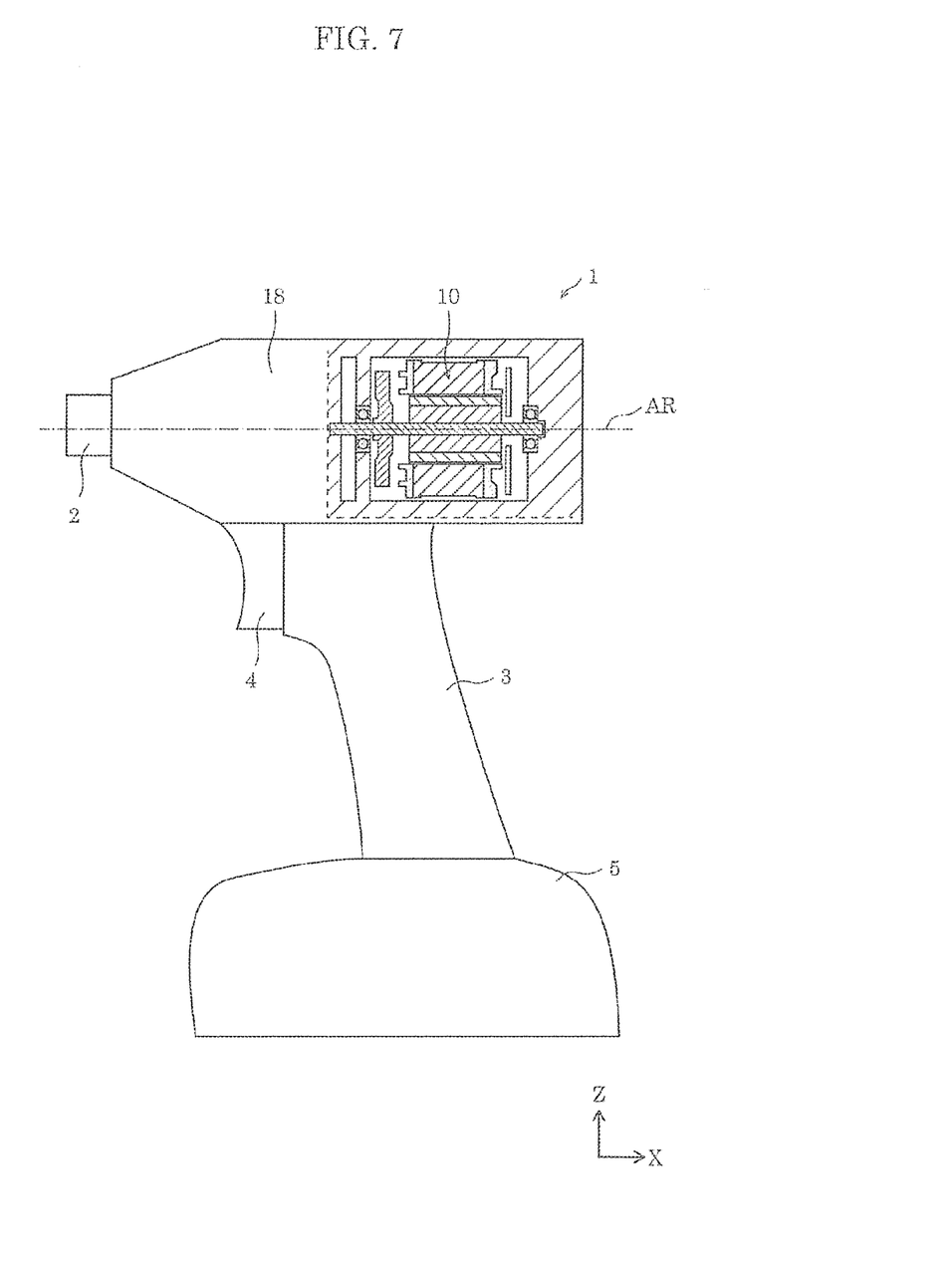
FIG. 7 is a side view, partially in cross section, of an electrically powered tool according to Embodiment 2.

Hereinafter, as one aspect of the present invention, electrically powered tool 1 that includes brushless motor 10 will be described with reference to the drawings. FIG. 7 is a side view, partially in cross section, of electrically powered tool 1 according to Embodiment 2. In FIG. 7, the area surrounded by a dotted line shows a cross section showing the vicinity of brushless motor 10. Also, hereinafter, in order to simplify the description, in FIG. 7, the left side of the paper plane in X axis direction will be referred to as the tip end side, and the lower side of the paper plane in Z axis direction will be referred to as the bottom portion side.

As shown in FIG. 7, electrically powered tool 1 may be, for example, a drill driver, an impact driver or the like, and includes brushless motor 10 as a drive source. Also, electrically powered tool 1 includes tool body 18, attachment portion 2, holder 3, trigger 4, and pedestal 5.

Tool body 18 is a cylindrical member that houses and fixes brushless motor 10. Tool body 18 includes housing 18 according to Embodiment 1. Although not shown in the diagram, housing 18 is composed of two halves corresponding to housing pieces 181 and 182, each of the two halves including a fixing portion that contacts with a notch portion of brushless motor 10. In other words, tool body 18 fixes the stator core of brushless motor 10.

Also, although not shown in the diagram, tool body 18 also houses a rotation transmitting mechanism that transmits a rotational force of the shaft of brushless motor 10 toward attachment portion 2, wiring or circuitry that supplies power from a rechargeable battery to the circuit substrate of brushless motor 10 according to the condition of trigger 4, and the like.

Attachment portion 2 is a portion where a bit having a shape corresponding to the usage application of electrically powered tool 1 is rotatably attached to tool body 18, and is connected to the tip end side of tool body 18. In attachment portion 2, a rotational force transmitted through the rotation transmitting mechanism is added to the bit to cause the bit to rotate with respect to tool body 18. Electrically powered tool 1 is configured such that axis of rotation AR of brushless motor 10 is coincident with the center axis of tool body 18 and attachment portion 2, and the bit also rotates about axis of rotation AR, but the configuration is not limited thereto. The axis of rotation of the bit may be offset from axis of rotation AR by using an appropriate rotation transmitting mechanism.

Holder 3 is a member for holding electrically powered tool 1 when in use, and is connected to the bottom portion side of tool body 18. Also, holder 3 houses a switching circuit that selects whether there is a supply of power to brushless motor 10 according to the condition of trigger 4, wiring, and the like.

Trigger 4 is a switch that drives or stops brushless motor 10, and is disposed on the tip end side of holder 3. Trigger 4 is configured to be capable of being pressed toward holder 3. When trigger 4 is pressed into holder 3, power is supplied to brushless motor 10 through the switching circuit to cause the shaft to rotate. When an external force is not applied, trigger 4 retains a protruding state from holder 3 toward the tip end by a spring or the like provided within holder 3. Accordingly, upon removal of a pressing force pressing trigger 4 toward holder 3 while the shaft is rotating, trigger 4 springs out from holder 3, and the supply of power to brushless motor 10 stops, and the rotation of the shaft stops.

Pedestal 5 is a member that can erect electrically powered tool 1 when electrically powered tool 1 is placed on the floor or the like. Pedestal 5 is connected to the bottom portion of holder 3 and has a flat bottom surface. Also, a rechargeable battery is housed in pedestal 5, and the rechargeable battery is electrically connected to brushless motor 10 through the wiring of holder 3 and is capable of supplying power to the circuit substrate of brushless motor 10. By housing a heavy rechargeable battery in pedestal 5, the center of gravity of electrically powered tool 1 can be lowered from tool body 18 to holder 3 side. Accordingly, electrically powered tool 1 has an improved stability when it is held.

As described above, electrically powered tool 1 includes brushless motor 10 according to Embodiment 1 and tool body 18 to which the stator core of brushless motor 10 is fixed. Tool body 18 includes a fixing portion that contacts with a notch portion of brushless motor 10. With this configuration, in electrically powered tool 1, it is possible to prevent the stator core of brushless motor 10 from rotating in the circumferential direction of the stator core with respect to tool body 18. In other words, it is possible to reduce operational malfunction, undesirable vibration, noise and the like in electrically powered tool 1. Also, in brushless motor 10, the increase in the core loss generated in the stator core is prevented, and thus in electrically powered tool 1, it is possible to efficiently convert the power of the rechargeable battery to a rotational force and reduce the power consumption.

Note that the structural members of electrically powered tool 1 are merely examples, and thus additions, omissions, modifications, and the like can be made to the structural members. For example, in electrically powered tool 1, pedestal 5 may be omitted, and a power cord may be provided instead. Also, in electrically powered tool 1, holder 3 may be provided on the rear side of tool body 18, rather than on the bottom portion side of tool body 18. Furthermore, holder 3 may have a function of changing the angle with respect to tool body 18 within a defined range. Also, electrically powered tool 1 may include, for example, on the surface of tool body 18 or holder 3, an operational portion for determining the rotational direction of brushless motor 10.

Also, in the above description, it is stated that electrically powered tool 1 including brushless motor 10 can be a drill driver, an impact driver, or the like. However, electrically powered tool 1 including brushless motor 10 is not limited thereto, and may be, for example, an electrically powered tool that outputs rotation in, for example, a motorized saw, a lawn mower, a dust collector, or an air blower. Also, the electrically powered tool including brushless motor 10 is not limited to the electrically powered tool that outputs rotation, and may further include, for example, a power converter such as a pump, a cylinder, or a crank. By doing so, a device with a wide range of applications can be obtained.

The present invention has been described above based on Embodiments 1 and 2, but the present invention is not limited to the embodiments given above. The present invention also encompasses embodiments obtained by making various modifications that can be conceived by a person having ordinary skill in the art to the above embodiments as well as embodiments implemented by any combination of the structural elements and the functions of the above embodiments without departing from the scope of the present invention.

The invention claimed is:

1. A brushless motor comprising:
a stator core including a cylindrical yoke portion and a teeth portion having a shape protruding from an inner circumferential surface of the yoke portion; and
a rotor that is disposed inside the stator core, spaced apart from the teeth portion, and uses a center axis of the yoke portion as an axis of rotation, wherein:
the yoke portion includes, on an outer circumferential surface of the yoke portion, a notch portion at a position on a back side of the teeth portion,
the notch portion has a circumferential width smaller than a circumferential width of the teeth portion, and
where a radial width of a part of the yoke portion that does not include the notch portion is defined as a yoke width,
in a cross section perpendicular to the axis of rotation, a surface of the teeth portion is shaped in an arc that is concavely curved inwardly of the teeth portion at a bonding portion where the teeth portion and the yoke portion are bonded, and the notch portion is present outside a range from a center of the arc to a total length of a radius of the arc and the yoke width.

2. The brushless motor according to claim 1,
wherein, where a radial width of a part of the yoke portion that does not include the notch portion is defined as a yoke width,
a minimum distance from the notch portion to a surface of the teeth portion is greater than the yoke width.

3. The brushless motor according to claim 1,
wherein, in a cross section perpendicular to the axis of rotation, the notch portion has a V shape, and an angle formed between a radial direction and each of two sides of the V shape is 25° or more and 65° or less.

4. The brushless motor according to claim 1,
wherein, in a cross section perpendicular to the axis of rotation, the notch portion has a V shape, and each of two sides of the V shape is convexly curved outwardly of the yoke portion.

5. The brushless motor according to claim 1,
wherein a length of the notch portion in a direction extending along the axis of rotation is shorter than a length of the outer circumferential surface of the yoke portion extending along the axis of rotation.

6. The brushless motor according to claim 1, further comprising
a housing that houses the stator core and the rotor,
wherein the notch portion is in contact with the housing.

7. The brushless motor according to claim 6,
wherein the housing has a cut plane, and includes two housing pieces bonded to each other at the cut plane, and
the notch portion that is in contact with each of the housing pieces is open in a direction perpendicular to the cut plane of the housing piece.

8. An electrically powered tool comprising:
the brushless motor according to claim 1; and
a tool body to which the stator core of the brushless motor is fixed,
wherein the tool body includes a fixing portion that is in contact with the notch portion.

\* \* \* \* \*